US009936353B2

(12) United States Patent
Lv et al.

(10) Patent No.: US 9,936,353 B2
(45) Date of Patent: Apr. 3, 2018

(54) METHOD, SERVER DEVICE AND MOBILE TERMINAL FOR PROCESSING INFORMATION

(71) Applicant: TENCENT TECHNOLOGY (SHENZHEN) COMPANY LIMITED, Shenzhen (CN)

(72) Inventors: Yuanfang Lv, Shenzhen (CN); Yongfa Li, Shenzhen (CN); Qiong Wang, Shenzhen (CN); Yuxiang Fan, Shenzhen (CN); Huaheng Fan, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 214 days.

(21) Appl. No.: 14/736,570

(22) Filed: Jun. 11, 2015

(65) Prior Publication Data
US 2015/0281903 A1 Oct. 1, 2015

Related U.S. Application Data (63) Continuation of application No. PCT/CN2013/087461, filed on Nov. 20, 2013.

(30) Foreign Application Priority Data

Dec. 20, 2012 (CN) .......................... 2012 1 0558561

(51) Int. Cl.
*H04W 4/02* (2009.01)

(52) U.S. Cl.
CPC ............. *H04W 4/023* (2013.01); *H04W 4/02* (2013.01)

(58) Field of Classification Search
CPC ................................ H04W 4/02; H04W 4/023
(Continued)

(56) References Cited

U.S. PATENT DOCUMENTS

2002/0091568 A1  7/2002  Kraft et al.
2006/0253481 A1  11/2006 Guido et al.
(Continued)

FOREIGN PATENT DOCUMENTS

CN   101299769 A   11/2008
CN   101529834 A   9/2009
(Continued)

OTHER PUBLICATIONS

International Search Report for International Application No. PCT/CN2013/087451, dated Feb. 27, 2014.
(Continued)

*Primary Examiner* — Erica Navar
(74) *Attorney, Agent, or Firm* — Harness, Dickey & Pierce, P.L.C.

(57) ABSTRACT

A search request transmitted by a first mobile terminal may be received. The search request may carry location information of the first mobile terminal, when the first mobile terminal transmits the search request. A corresponding grid number may be obtained, based on the location information. The grid number is configured to identify a preset longitude and latitude range of the earth sphere. Information searching for may be obtained based on the grid number. Information searched out may be transmitted to the first mobile terminal.

12 Claims, 7 Drawing Sheets

(58) Field of Classification Search
USPC .............................................. 455/456.1–457
See application file for complete search history.

(56) References Cited

U.S. PATENT DOCUMENTS

| | | |
|---|---|---|
| 2008/0070588 A1 | 3/2008 | Morin |
| 2008/0311984 A1 | 12/2008 | Mai |
| 2011/0137881 A1 | 6/2011 | Cheng et al. |
| 2012/0036034 A1* | 2/2012 | Golden .................. H04W 4/02 705/26.3 |

FOREIGN PATENT DOCUMENTS

| | | |
|---|---|---|
| CN | 101854587 A | 10/2010 |
| CN | 102004793 A | 4/2011 |
| CN | 102342165 A | 2/2012 |
| CN | 102713906 A | 10/2012 |
| JP | 2012203408 A | 10/2012 |
| TW | 200917145 A | 4/2009 |

OTHER PUBLICATIONS

Taiwan Office Action for Application No. 102144191 dated Nov. 27, 2013 and an English concise explanation of relevance thereof.
International Preliminary Report for Application No. PCT/CN2013/087461 dated Jul. 2, 2015.
Chinese Office Action for Application No. 2012105585614 dated Sep. 1, 2017 and an English concise explanation of relevance thereof.

* cited by examiner

METHOD, SERVER DEVICE AND MOBILE TERMINAL FOR PROCESSING INFORMATION

CROSS-REFERENCE TO RELATED APPLICATIONS

This application is a continuation of International Application No. PCT/CN2013/087461, filed Nov. 20, 2013. This application claims the benefit and priority of Chinese Application No. 201210558561.4, filed Dec. 20, 2012. The entire disclosures of each of the above applications are incorporated herein by reference.

FIELD

The present disclosure relates to Internet technologies and to a method, server device and mobile terminal for processing information.

BACKGROUND

This section provides background information related to the present disclosure which is not necessarily prior art.

With the development of technology and the popularity of mobile terminals, many users have begun to utilize various Internet applications installed by mobile terminals to record users' daily activities. For example, a user may record the user's daily activities and express reactions through microblogs, blogs, or in a space or forum of a mobile terminal.

In the prior art, geographic positioning functions may be generally set within a mobile terminal. When a user publishes a variety of information within a mobile terminal, location information of the mobile terminal may also be provided. For example, when a user enjoys activities at a certain place, such as dining or fitness training, the user may publish a microblog within a mobile terminal to record the user's feelings. The user may display in the published microblog the location information of the user, that is, the location of the mobile terminal. When another user wants to search for some related life information about the location, such as dining or fitness, another user may transmit a request to a server requesting the server to search for all of the other microblogs published by current location, so as to obtain information searching from all of the other microblogs.

During the process of implementing the present disclosure, the following issues exist in the prior art. When processing information in the prior art, if a user transmits a request with a mobile terminal to a server to search for all of the other information published by current location, the server may employ a geohash method to implement the search of all of the other information published by current location. Search speed may be slower. Search efficiency may be lower. Subsequently, information processing efficiency may be lower.

SUMMARY

This section provides a general summary of the disclosure, and is not a comprehensive disclosure of its full scope or all of its features.

To address the challenges in the prior art, various embodiments of the present disclosure provide a method, server device and mobile terminal for processing information.

According to various embodiments, an information processing method is provided, which includes:

receiving a search request transmitted by a first mobile terminal, wherein the search request carries location information of the first mobile terminal, when the first mobile terminal transmits the search request;

obtaining a corresponding grid number based on the location information, wherein the grid number is configured to identify a preset longitude and latitude range of the earth sphere;

obtaining information searching for based on the grid number; and transmitting information searched out to the first mobile terminal.

According to various embodiments, a server device is provided, which includes a memory, a processor in communication with the memory, and an interface, wherein the memory stores a receiving instruction, a first obtaining instruction, a second obtaining instruction, and a transmitting instruction, which are executable by the processor. The receiving instruction indicates to receive a search request transmitted by a first mobile terminal via the interface, wherein the search request carries location information of the first mobile terminal, when the first mobile terminal transmits the search request. The first obtaining instruction indicates to obtain a corresponding grid number based on the location information, wherein the grid number is configured to identify a preset longitude and latitude range of the earth sphere. The second obtaining instruction indicates to obtain information searching for based on the grid number, The transmitting instruction indicates to transmit information searched out to the first mobile terminal.

According to various embodiments, a mobile terminal is provided, which includes a memory, a processor in communication with the memory, and an interface, wherein the memory stores an obtaining instruction and a transmitting instruction, which are executable by the processor. The obtaining instruction indicates to obtain a grid number of a grid located by the mobile terminal via the interface, wherein the mobile terminal is located in a preset longitude and latitude range identified by the grid number. The transmitting instruction indicates to transmit a search request carrying the grid number to a server, such that the server obtains information searching for based on the grid number, and return the information.

In accordance with the method, server device and mobile terminal for processing information provided by various embodiments of the present disclosure, a search request transmitted by a first mobile terminal may be received. The search request may carry location information located by the first mobile terminal, when the first mobile terminal transmits the search request. A corresponding grid number may be obtained, based on the location information. The grid number is configured to identify a preset longitude and latitude range of the earth sphere. Based on the grid number, information searching for may be obtained. Information searched out may then be transmitted to the first mobile terminal. Based on the technical method provided by various embodiments of the present disclosure, the corresponding grid number may be obtained based on location information. The information searching for may be obtained based on the grid number. Compared with a search scheme based on geohash method in the prior art, the server device may be enabled to rapidly search out the information. Search speed may be faster. Search efficiency may be higher. Information processing efficiency may be improved effectively.

Further areas of applicability will become apparent from the description provided herein. The description and examples in this summary are intended for purposes of illustration and are not intended to limit the scope of the present disclosure.

DRAWINGS

The drawings described herein are for illustrative purposes of various embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

For simplicity and illustrative purposes, the present disclosure is described by referring to various embodiments. In the following description, numerous details are set forth in order to provide a thorough understanding of the present disclosure. It will be readily apparent however, that the present disclosure may be practiced without limitation to these details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

To make the technical methods and advantages of the present disclosure more clear, detailed descriptions about implementation modes of the present disclosure will be provided in the following, accompanying the attached figures.

Figure 1:
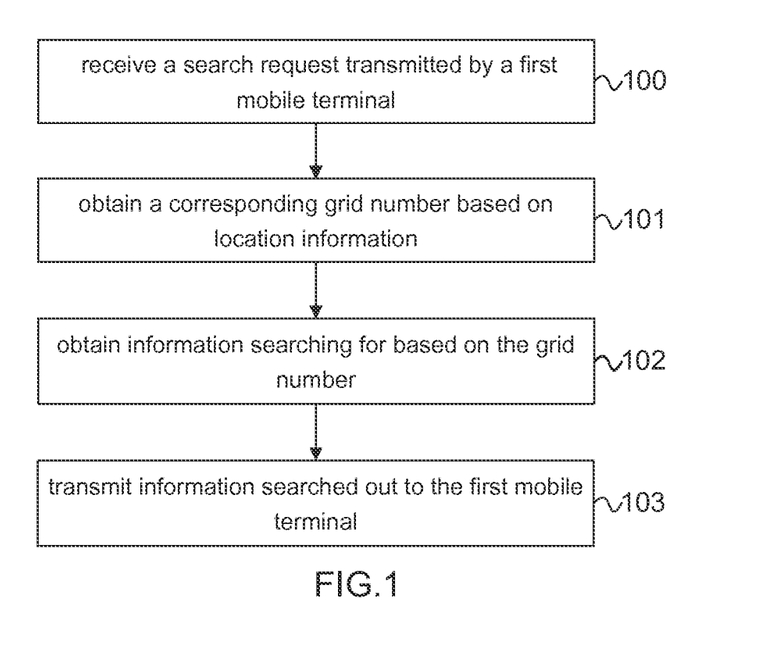
FIG. 1 is a flowchart illustrating a method for processing information, according to various embodiments.

FIG. 1 is a flowchart illustrating a method for processing according to various embodiments. The executive agent of the information processing method according to various embodiments may be a server device. As shown in FIG. 1, the information processing method may include the following blocks.

Block 100: Receive a search request transmitted by a first mobile terminal. According to various embodiments, the search request may carry location information located by the first mobile terminal, when the first mobile terminal transmits the search request.

Block 101: Obtain a corresponding grid number based on the location information. According to various embodiments, the grid number is configured to identify a preset longitude and latitude range of the earth sphere.

Block 102: Obtain information searching for based on the grid number.

Block 103: Transmit information searched out to the first mobile terminal.

In accordance with the information processing method according to the various embodiments, the search request transmitted by the first mobile terminal may be received. The search request may carry location information located by the first mobile terminal, when the first mobile terminal transmits the search request. The corresponding grid number may be obtained, based on the location information. The grid number is configured to identify a preset longitude and latitude range of the earth sphere. Information searching for may be obtained, based on the grid number. Information searched out may be transmitted to the first mobile terminal. Based on the technical methods of the various embodiments, the corresponding grid number may be obtained based on the location information. The information searching for may be obtained, based on the grid number. Compared with the search scheme based on the geohash method in the prior art, the server device may be enabled to rapidly search out the information. Search speed may be faster. Search efficiency may be higher. Information processing efficiency may be improved effectively.

Based on the technical method provided by the various embodiments illustrated with FIG. 1, in block 100, the location information in the search request transmitted by the first mobile terminal may include a grid encoding, or longitude and latitude information located by the first mobile terminal, when the first mobile terminal transmits the search request. When the location information in the search request transmitted by the first mobile terminal includes the grid encoding, in block 101, the corresponding grid number may be directly obtained, based on the location information. The information according to various embodiments may be microblog, or other information similar to the microblog. To facilitate descriptions, the technical methods of the present disclosure may be described in the following according to various embodiments, in which the information refers to the microblog.

Based on the technical method of the foregoing various embodiments, when the location information includes the longitude and latitude information located by the first mobile terminal, when the first mobile terminal transmits the search request, at this time, block 101 "obtain a corresponding grid number based on the location information" and may include the following. Based on a preset longitude and latitude range of the earth sphere, which is identified by each grid number, the grid number corresponding to the longitude and latitude information located by the first mobile terminal, when the first mobile terminal transmits the search request, may be obtained. The longitude and latitude located by the first mobile terminal, when the first mobile terminal transmits the search request, are included in a preset longitude and latitude range identified by the grid number.

Based on the technical method of the foregoing various embodiments, block 102 "obtain information searching for based on the grid number" may include the following. Obtain first information corresponding to the grid number, based on a corresponding relationship between the grid number and information identity (ID), as well as the grid number. According to various embodiments, when the information is microblog, microblog ID may be employed to uniquely identify the microblog. Each microblog ID may correspond to one grid number, so as to represent location information when the microblog is published. Conversely, numerous microblogs may be published in the same location, that is, one grid number may correspond to numerous microblog IDs. Thus, there may be multiple microblogs corresponding to one grid number.

Based on the technical method of the foregoing various embodiments, before block 100 "receive a search request transmitted by a first mobile terminal", the server device has already stored a corresponding relationship between the grid number and information ID of the first information. Thus, before block 100, the following blocks may also be included.

Receive first information transmitted by a second mobile terminal. The first information may carry first location information. The first location information may include a grid number, or longitude and latitude information located by the second mobile terminal, when the second mobile terminal transmits the first information. The longitude and latitude information located by the second mobile terminal, when the second mobile terminal transmits the first information, is included in a preset longitude and latitude range identified by the grid number.

Establish a corresponding relationship between the grid number and the information ID of the first information.

In the foregoing technical method, the amount of obtained first information corresponding to the grid number may be too small, which may not meet practical requirements. At this time, block 102 "obtain information searching for based on the grid number" may further include the following. Obtain the nearest adjacent grid number of the grid number. Obtain second information corresponding to the nearest adjacent grid number, based on the corresponding relationship between the grid number and information ID, as well as the nearest adjacent grid number.

Further, corresponding to the technical method, before block 100 "receive a search request transmitted by a first mobile terminal", the server device has already stored a corresponding relationship between the grid number and the information ID of the second information. Thus, before block 100, the following blocks may also be included. Receive the second information transmitted by a third mobile terminal.

The second information may carry second location information. The second location information may include a grid number, or longitude and latitude information located by the third mobile terminal, when the third mobile terminal transmits the second information. The longitude and latitude information located by the third mobile terminal, when the third mobile terminal transmits the second information, is included in the preset longitude and latitude range identified by the grid number. Establish a corresponding relationship between the nearest adjacent grid number and the information ID of the second information.

Further, based on the technical method of the foregoing various embodiments, before block 100 "receive a search request transmitted by a first mobile terminal", the following technical methods may also be included.

Block 1: Project the earth sphere onto a plane of L1*L2, based on equatorial circumference L1, as well as spherical distance L2 of south and north poles.

According to various embodiments, project the earth sphere onto a plane of 40076 kilometers*20038 kilometers (ignore the distance between latitudes gradually becomes 0 from equator to south and north poles), based on the equatorial circumference L1 (40076 kilometers, longitude direction, which will be denoted with L1 in the following), as well as spherical distance L2 of south and north poles (20038 kilometers, latitude direction, which will be denoted with L2 in the following).

Block 2: Divide the plane of L1*L2 into multiple grids equally, based on a preset distance unit. Each grid ID of the multiple grids may correspond to a preset longitude and latitude range of the earth sphere. The preset distance unit may be 1*1 kilometers, 2*2 kilometers, 3*3 kilometers, or other distance units.

Block 3: Number the multiple grids successively, and obtain multiple grid numbers. Each grid may correspond to a certain longitude and latitude range. To facilitate the division of grids and to determine a longitude and latitude range corresponding to each grid, before block 1, 90 degrees may be added to latitude of the latitude range of the earth 90°0'0" south-90°0'0" north, and 180 degrees may be added to longitude of the longitude range of the earth 180°0'0" west-180°0'0" east, such that the longitude and latitude are positive values.

Alternatively, the server device may not divide grids, instead, the server device may directly obtain the corresponding relationship between the grid and longitude and latitude range corresponding to the grid, as well as each grid number from other devices, so as to process the foregoing information. The algorithm may be described in the following according to various embodiments of 1*1 kilometers.

Suppose longitude and latitude are as follows. Latitude is denoted by lat=22°32'37" north (decimal format is +22.543611°). Longitude is denoted by lon=113°55'49" east (decimal format is +113.930277°). Divide L1 into 40076÷1=40076 equal parts at the longitude direction, based on the distance unit of 1 kilometers. Ion may then be located in the $32721^{th}$ equal part. The calculating formula may be $((113.930277+180)÷360)×(40076÷1)≈32721$. Divide L2 into 20038≥1=20038 equal parts at the latitude direction, based on the distance unit of 1 kilometers. Subsequently, lat may be located in the $12529^{th}$ equal part. The calculating formula may be $((22.543611+90)÷180)×(20038÷1)≈12529$. Take the longitude direction and the latitude direction respectively as x axis and y axis, a number of a grid located by the longitude and latitude may be 502144925. The calculating formula may be 40076×12529+32721=502144925.

The information processing method provided by the foregoing various embodiments have provided all of the optional technical methods. All of the optional technical methods of the foregoing various embodiments may be combined in any way to form an optional example of the present disclosure, which will not be repeated here.

Based on the information processing method provided by the foregoing various embodiments, the corresponding grid number may be obtained based on location information. Information searching may be obtained based on the grid number. Compared with the search scheme based on the geohash method in the prior art, the server device may be enabled to rapidly search out the information searching for. Search speed may be faster. Search efficiency may be higher. Information processing efficiency may be effectively improved.

Figure 2:
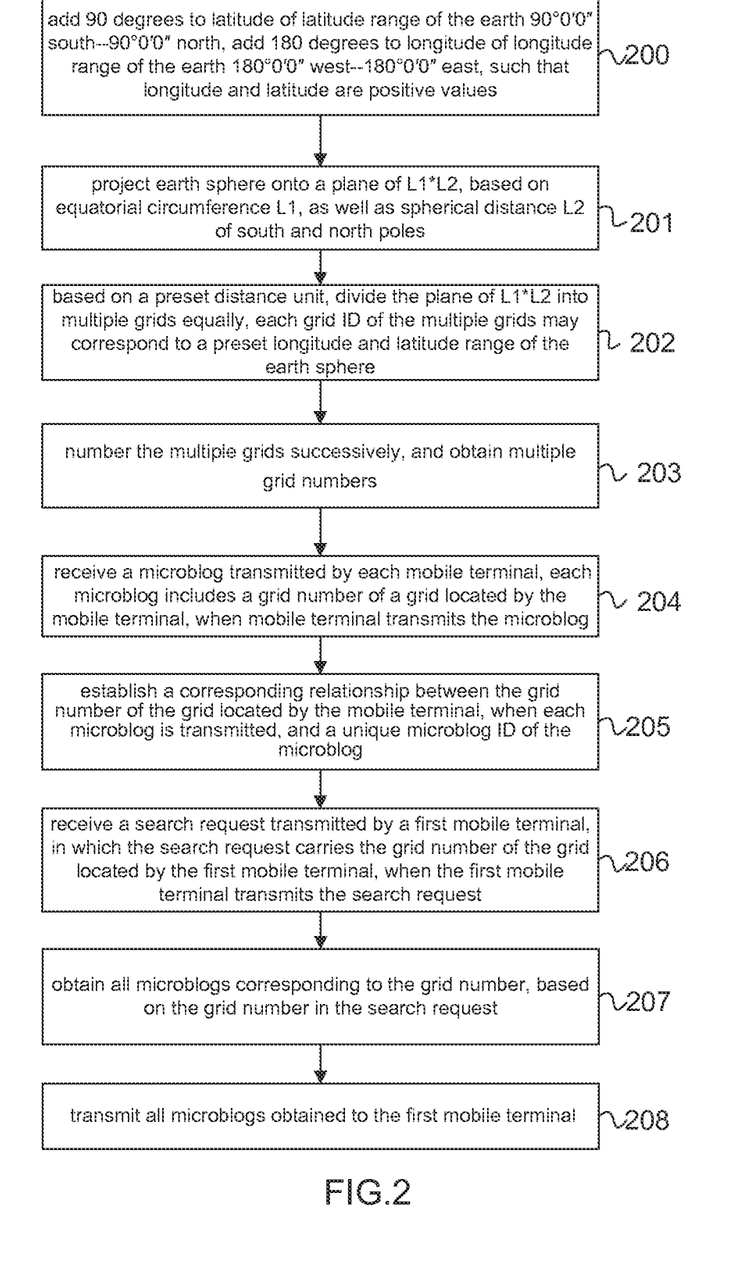
FIG. 2 is a flowchart illustrating a method for processing information, according to various embodiments.

FIG. 2 is a flowchart illustrating a method for processing information, according to various embodiments. Based on the technical method of FIG. 1 and subsequent optional technical methods, the information processing method according to various embodiments may describe the technical method of the present disclosure in more detail. The executive agent of the information processing method according to various embodiments may still be a server device. As shown in FIG. 2, the information processing method according to various embodiments may include the following blocks.

Block 200: Add 90 degrees to latitude of latitude range of the earth 90°0'0" south-90°0'0" north, and add 180 degrees to longitude of longitude range of the earth 180°0'0" west-180°0'0" east, such that the longitude and latitude are positive values.

Block 201: Project the earth sphere onto a plane of L1*L2, based on equatorial circumference L1, as well as spherical distance L2 of south and north poles.

Block 202: Divide the plane of L1*L2 into multiple grids equally, based on a preset distance unit. Each grid ID of the multiple grids may correspond to a preset longitude and latitude range of the earth sphere.

Block 203: Number the multiple grids successively, and obtain multiple grid numbers.

Block 204: Receive a microblog transmitted by each mobile terminal. Each microblog may include a number of a grid located by the mobile terminal, when the mobile terminal transmits the microblog.

Block 205: Establish a corresponding relationship between the number of the grid located by the mobile terminal, when each microblog is transmitted, and a microblog ID used for uniquely identifying the microblog.

Block 206: Receive a search request transmitted by a first mobile terminal. The search request may carry the number of the grid located by the first mobile terminal, when the first mobile terminal transmits the search request.

Block 207: Obtain all microblogs corresponding to the number of the grid, based on the number of the grid in the search request.

Block 208: Transmit all microblogs obtained to the first mobile terminal.

Based on the information processing method provided according to various embodiments, a microblog searching for may be obtained, based on the grid number. Compared with the search scheme based on the geohash method in the prior art, the server device may be enabled to rapidly search out the information searching for. Search speed may be faster. Search efficiency may be higher. Information processing efficiency may be improved effectively.

Figure 3:
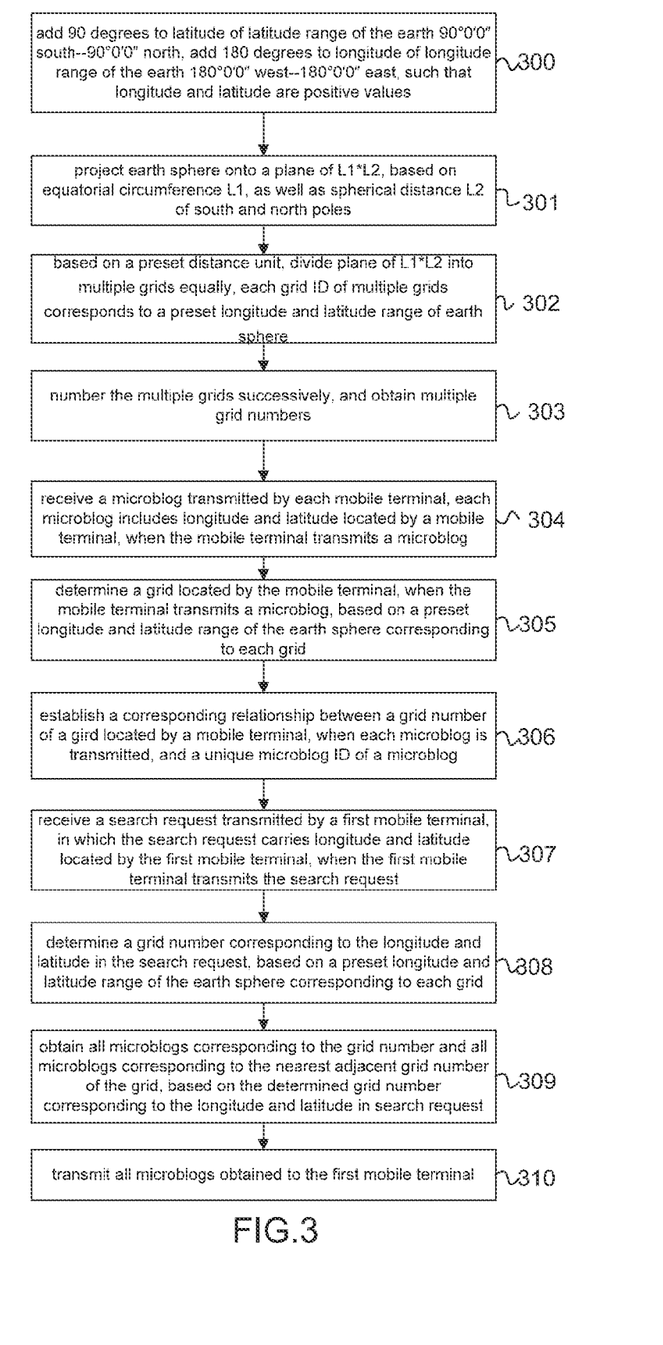
FIG. 3 is a flowchart illustrating a method for processing information, according to various embodiments.

FIG. 3 is a flowchart illustrating a method for processing information, according to various embodiments. Based on the technical method of FIG. 1 and subsequent optional technical methods, the information processing method of the various embodiments may describe the technical method of the present disclosure in more detail. The executive agent of the information processing method according to various embodiments is still a server device. As shown in FIG. 3, the information processing method of the various embodiments may include the following blocks.

Block 300: Add 90 degrees to latitude of latitude range of the earth 90°0'0" south-90°0'0" north, and add 180 degrees to longitude of longitude range of the earth 180°0'0" west-180°0'0" east, such that longitude and latitude are positive values.

Block 301: Project the earth sphere onto a plane of L1*L2, based on equatorial circumference L1, as well as spherical distance L2 of south and north poles.

Block 302: Divide the plane of L1*L2 into multiple grids equally, based on a preset distance unit. Each grid ID of the multiple grids may correspond to a preset longitude and latitude range of the earth sphere.

Block 303: Number the multiple grids successively and obtain multiple grid numbers.

Block 304: Receive a microblog transmitted by each mobile terminal. Each microblog includes the longitude and latitude information located by the mobile terminal, when the mobile terminal transmits the microblog.

Block 305: Determine a grid located, when each microblog is transmitted, based on the preset longitude and latitude range of the earth sphere corresponding to each grid.

Block 306: Establish a corresponding relationship between the number of the grid located by the mobile terminal, when each microblog is transmitted, and a microblog ID used for uniquely identifying the microblog.

Block 307: Receive a search request transmitted by a first mobile terminal. The search request may carry longitude and latitude information located by the first mobile terminal, when the first mobile terminal transmits the search request.

Block 308: Determine a grid number corresponding to the longitude and latitude information in the search request, based on the preset longitude and latitude range of the earth sphere corresponding to each grid. That is, when the first mobile terminal transmits the search request, a grid located by the first mobile terminal may be determined.

Block 309: Based on the determined grid number corresponding to the longitude and latitude information in the search request, obtain all microblogs corresponding to the grid number and all microblogs corresponding to the nearest adjacent grid number of the grid.

To expand search information, according to various embodiments, the nearest adjacent grid of a grid corresponding to the grid number may be obtained. Subsequently, all microblogs corresponding to the grid number of the nearest adjacent grid may be obtained. According to various embodiments, the nearest adjacent grid and current grid are two closest grids on the earth's interface.

Block 310: Transmit all microblogs obtained to the first mobile terminal.

Based on the information processing method provided by the various embodiments, the microblog searching for may be obtained based on the grid number. Compared with the search scheme based on the geohash method in the prior art, the server device may be enabled to rapidly search out the information searching for. Search speed may be faster. Search efficiency may be higher. Information processing efficiency may be improved effectively.

Figure 4:
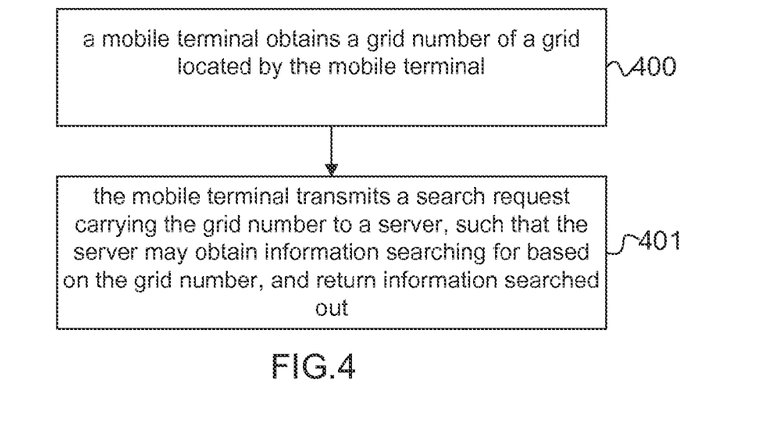
FIG. 4 is a flowchart illustrating a method for processing information, according to various embodiments.

FIG. 4 is a flowchart illustrating a method for processing information, according to various embodiments. As shown in FIG. 4, the information processing method of the various embodiments may include the following blocks.

Block 400: A mobile terminal may obtain a number of a grid currently located by the mobile terminal. The mobile terminal is located in a preset longitude and latitude range identified by the number of the grid.

Block 401: The mobile terminal may transmit a search request carrying the number of the grid to a server, such that the server may obtain the information searching for based on the number of the grid, and return the information obtained.

The various embodiments correspond to the following technical method. In the foregoing server device side, the search request transmitted by the first mobile terminal carries the number of the grid. The implementation process is similar to descriptions about foregoing related various embodiments, which may refer to descriptions of the foregoing related various embodiments and will not be repeated here.

In accordance with the information processing method according to various embodiments, a mobile terminal may obtain a number of a grid currently located. The mobile terminal is located in the preset longitude and latitude range identified by the number of the grid. The mobile terminal may transmit a search request carrying the number of the grid to the server, such that the server may obtain the information searching for based on the number of the grid, and return the information obtained. Based on the technical method of the various embodiments, a search request carrying the number of the grid may be transmitted to the server device, such that the server device may obtain a corresponding grid number based on the location information, and obtain the information searching for based on the grid number. Compared with the search scheme based on the geohash method in the prior art, the server device may be enabled to rapidly search out the information searching for. Search speed may be faster. Search efficiency may be higher. Information processing efficiency may be improved effectively.

Further, based on the technical method according to various embodiments illustrated with FIG. 4, block 400 "a mobile terminal may obtain a number of a grid currently located by the mobile terminal" may include the following. The mobile terminal obtains current longitude and latitude information. The mobile terminal obtains a grid number corresponding to current longitude and latitude information, based on a preset longitude and latitude range of the earth sphere identified by each grid number.

Further, based on the technical method of the foregoing various embodiments, before block 400 "a mobile terminal may obtain a number of a grid currently located by the mobile terminal", the following blocks may also be included. Project the earth sphere onto a plane of L1*L2, based on equatorial circumference L1, as well as spherical distance L2 of south and north poles. The mobile terminal may divide the plane of L1*L2 into multiple grids equally, based on a preset distance unit. Each grid ID of the multiple grids may correspond to a preset longitude and latitude range of the earth sphere. (The mobile terminal may number the multiple grids successively, and obtain multiple grid numbers.

The implementation process may be similar to the implementation mechanism of the foregoing server device side, which may refer to descriptions about the foregoing related various embodiments and will not be repeated here.

The information processing method of the various embodiments has provided all of the optional technical methods of the various embodiments. All of the optional technical methods of the foregoing various embodiments may be combined in any way to form an optional example of the present disclosure, which will not be repeated here.

In accordance with the information processing method provided by the foregoing various embodiments, the search request carrying the grid number may be transmitted to the server device, such that the server device may obtain the corresponding grid number based on the location information, and obtain the information searching for based on the grid number. Compared with the search scheme based on the geohash method in the prior art, the server device may be enabled to rapidly search out the information searching for. Search speed may be faster. Search efficiency may be higher. Information processing efficiency may be improved effectively.

Figure 5:
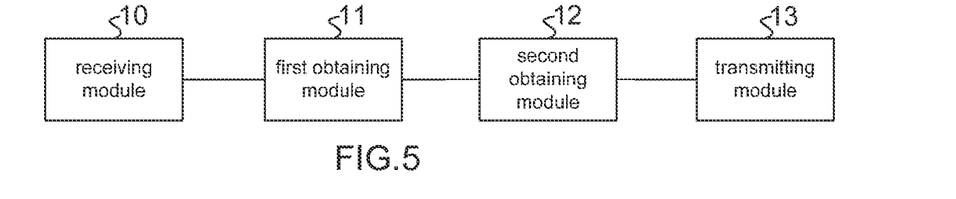
FIG. 5 is a diagram illustrating structure of a server device, according to various embodiments.

FIG. 5 is a diagram illustrating structure according to various embodiments. As shown in FIG. 5, the server device according to various embodiments may include a receiving module 10, a first obtaining module 11, a second obtaining module 12, and a transmitting module 13.

The receiving module 10 is configured to receive a search request transmitted by a first mobile terminal. The search request may carry location information located by the first mobile terminal, when the first mobile terminal transmits the search request. The first obtaining module 11 may be connected with the receiving module 10. The first obtaining module 11 is configured to obtain a corresponding grid number, based on the location information received by the receiving module 10. The grid number is configured to identify a preset longitude and latitude range of the earth sphere. The second obtaining module 12 may be connected with the first obtaining module 11. The second obtaining module 12 is configured to obtain the information searching for, based on the grid number obtained by the first obtaining module 11. The transmitting module 13 may be connected with the second obtaining module 12. The transmitting module 13 is configured to transmit the information searched out, which is obtained by the second obtaining module 12, to the first mobile terminal.

The implementation mechanism for processing information by using the foregoing modules in the server device according to various embodiments may be similar to that of the foregoing related method various embodiments, which may refer to descriptions of foregoing related various embodiments and will not be repeated here.

By using the foregoing modules in the server device according to various embodiments, the search request transmitted by the first mobile terminal may be received. The search request may carry location information located by the first mobile terminal, when the first mobile terminal transmits the search request. The corresponding grid number may be obtained based on the location information. The grid number is configured to identify a preset longitude and latitude range of the earth sphere. Information searching for may be obtained based on the grid number. The information searched out may be transmitted to the first mobile terminal. In the technical method according to various embodiments, the corresponding grid number may be obtained based on the location information. The information searching may also be obtained based on the grid number. Compared with the search scheme based on the geohash method in the prior art, the server device may be enabled to rapidly search out the information searching for. Search speed may be faster. Search efficiency may be higher. Information processing efficiency may be improved effectively.

Figure 6:
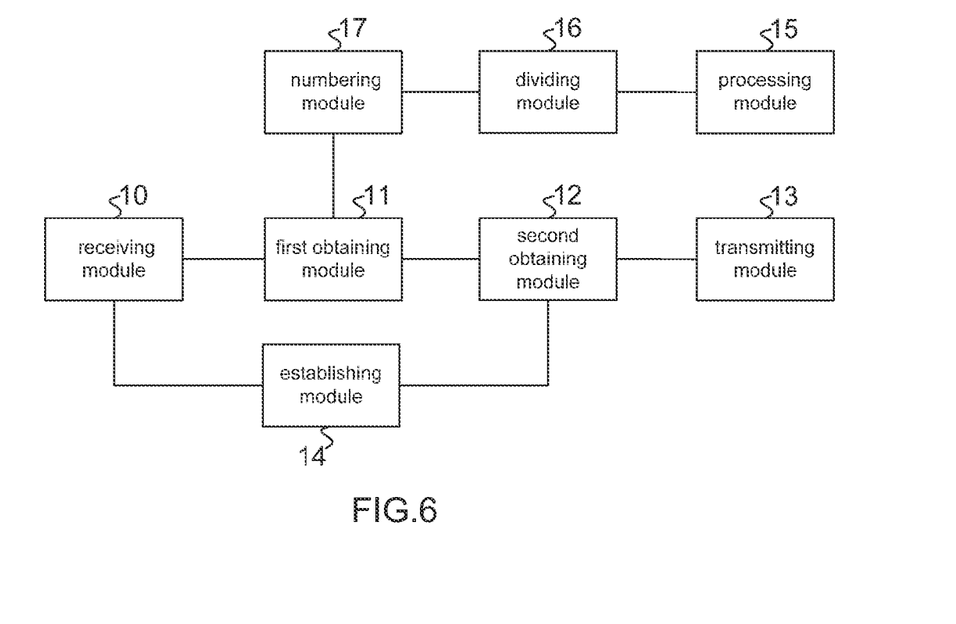
FIG. 6 is a diagram illustrating structure of a server device, according to various embodiments.

FIG. 6 is a diagram illustrating structure of a server device, according to various embodiments. As shown in FIG. 6, based on the various embodiments illustrated with FIG. 5, the server device in the various embodiments may also include the following.

In the server device according to various embodiments, the location information in the search request transmitted by the first mobile terminal, which is received by the receiving module 10, may include a grid number, or longitude and latitude information located by the first mobile terminal, when the first mobile terminal transmits the search request.

In the server device according to various embodiments, under the circumstances that the location information in the search request received by the receiving module 10 includes longitude and latitude information located by the first mobile terminal, when the first mobile terminal transmits the search request, the first obtaining module 11 is configured to obtain a grid number corresponding to the longitude and latitude information located by the first mobile terminal, when the first mobile terminal transmits the search request, based on a preset longitude and latitude range of the earth sphere identified by each grid number. The longitude and latitude located by the first mobile terminal, when the first mobile terminal transmits the search request, may be included in the preset longitude and latitude range identified by the grid number.

In the server device according to various embodiments, the second obtaining module 12 is configured to obtain first information corresponding to the grid number, based on the corresponding relationship between the grid number and the information ID, as well as the grid number obtained by the first obtaining module 11.

As shown in FIG. 6, the server device according to various embodiments may further include an establishing module 14.

Before receiving the search request transmitted by the first mobile terminal, the receiving module 10 is further configured to receive the first information transmitted by a second mobile terminal. The first information may carry first location information. The first location information may include a grid number, or longitude and latitude information located by the second mobile terminal, when the second mobile terminal transmits the first information. The longitude and latitude information located by the second mobile terminal, when the second mobile terminal transmits the first information, is included in the preset longitude and latitude range identified by the grid number. The establishing module 14 may be connected with the receiving module 10. The establishing module 14 is configured to establish a corresponding relationship between the grid number and information ID of the first information, based on the first information received by the receiving module 10 from the second mobile terminal.

At this time, the second obtaining module 12 may be connected with the establishing module 14. The second obtaining module 12 is configured to obtain the first information corresponding to the grid number, based on the corresponding relationship between the grid number and the information ID of the first information, which is established by the establishing module 14, as well as the grid number obtained by the first obtaining module 11.

In the server device according to various embodiments, the second obtaining module 12 is further configured to obtain the nearest adjacent grid number of the grid number, and obtain second information corresponding to the nearest adjacent grid number, based on the corresponding relationship between the grid number and the information ID, as well as the nearest adjacent grid number.

In the server device according to various embodiments, before receiving the search request transmitted by the first mobile terminal, the receiving module 10 is further configured to receive second information transmitted by a third mobile terminal. The second information may carry second location information. The second location information may include a grid number, or longitude and latitude information located by the third mobile terminal, when the third mobile terminal transmits the second information. The longitude and latitude information located by the third mobile terminal, when the third mobile terminal transmits the second information, is included in the preset longitude and latitude range identified by the grid number. The establishing module 14 is further configured to establish a corresponding relationship between the nearest adjacent grid number and the information ID of the second information.

At this time, the second obtaining module 12 may be connected with the establishing module 14. The second obtaining module 12 is configured to obtain the nearest adjacent grid number of the grid number, and obtain second information corresponding to the nearest adjacent grid number, based on the corresponding relationship between the grid number and the information ID, which is established by the establishing module 14, as well as the nearest adjacent grid number.

As shown in FIG. 6, the server device according to various embodiments may further include a processing module 15, a dividing module 16 and a numbering module 17.

Before receiving the search request from the first mobile terminal by the receiving module 10, the processing module 15 is configured to project the earth sphere onto a plane of L1*L2, based on equatorial circumference L1, as well as spherical distance L2 of south and north poles. The dividing module 16 may be connected with the processing module 15. The dividing module 16 is configured to divide the plane of L1*L2 obtained by the processing module 15 into multiple grids equally, based on a preset distance unit. Each grid ID of the multiple grids may correspond to a preset longitude and latitude range of the earth sphere.

The numbering module 17 may be connected with the dividing module 16. The numbering module 17 is configured to number the multiple grids obtained by the dividing module 16 successively, and obtain multiple grid numbers. At this time, the first obtaining module 11 may be connected with the numbering module 17. When the location information in the search request received by the receiving module 10 includes the longitude and latitude information located by the first mobile terminal, when the first mobile terminal transmits the search request, the first obtaining module 11 may be configured to obtain the grid number corresponding to the longitude and latitude information located by the first mobile terminal, when the first mobile terminal transmits the search request, based on the preset longitude and latitude range of the earth sphere identified by each grid number, which is obtained by the numbering module 17 after numbering.

By using the foregoing modules, the server device according to various embodiments has provided all of the optional technical methods according to various embodiments. All of the optional technical methods of the various embodiments may be combined in any way to form an optional example of the present disclosure, which will not be repeated here.

Implementation mechanism for processing information by using the foregoing modules in the server device of the various embodiments may be similar to the implementation mechanism according to the related method embodiments, which may refer to descriptions of foregoing related embodiments and will not be repeated here.

By employing the foregoing modules in the server device according to various embodiments, the corresponding grid number may be obtained based on the location information. Information searching for may also be obtained, based on the grid number. Compared with the search scheme based on the geohash method in the prior art, the server device may be enabled to rapidly search out the information searching for. Search speed may be faster. Search efficiency may be higher. Information processing efficiency may be improved effectively.

Figure 7:
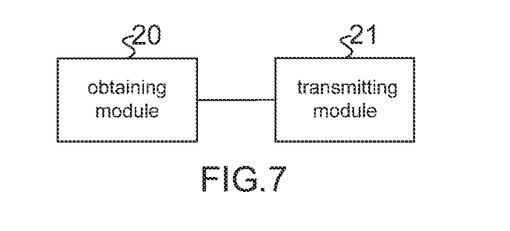
FIG. 7 is a diagram illustrating structure of a mobile terminal, according to various embodiments.

FIG. 7 is a diagram illustrating structure of a mobile terminal, according to various embodiments. As shown in FIG. 7, the mobile terminal according to various embodiments may include an obtaining module 20 and a transmitting module 21. The obtaining module 20 is configured to obtain a number of a grid currently located by the mobile terminal. The mobile terminal may be located in a preset longitude and latitude range identified by the number of the grid. The transmitting module 21 may be connected with the obtaining module 20. The transmitting module 21 is configured to transmit a search request, which carries the number of the grid obtained by the obtaining module 20, to a server, such that the server may obtain the information searching for based on the number of the grid, and return the information searched out.

The implementation mechanism for processing information by using the foregoing modules in the mobile terminal according to various embodiments may be similar to that according to the foregoing related method embodiments, which may refer to descriptions of the foregoing related embodiments and will not be repeated here.

By employing the foregoing modules in the mobile terminal according to various embodiments, a number of a grid currently located by the mobile terminal may be obtained. The mobile terminal may be located in a preset longitude and latitude range identified by the number of the grid. The mobile terminal may transmit a search request carrying the number of the grid to a server, such that the server may obtain the information searching for based on the number of the grid, and return the information searched out. In accordance with the technical method according to various embodiments, by transmitting the search request carrying the number of the grid to the server device, the server device may be enabled to obtain a corresponding grid number based on the location information, and obtain the information searching for based on the grid number. Compared with the search scheme based on the geohash method in the prior art, the server device may be enabled to rapidly search out the information. Search speed may be faster. Search efficiency may be higher. Information processing efficiency may be improved effectively.

Figure 8:
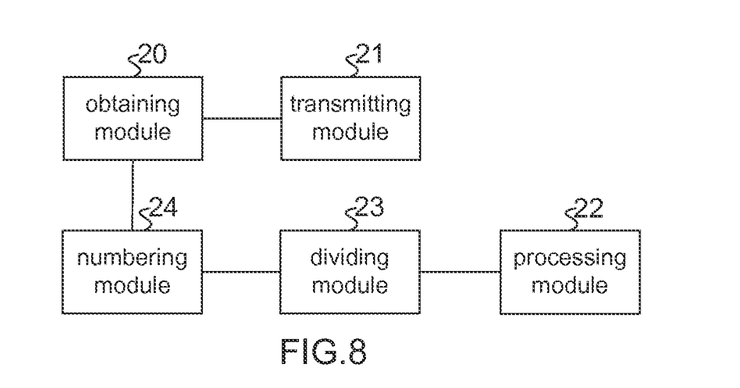
FIG. 8 is a diagram illustrating structure of a mobile terminal, according to various embodiments.

FIG. 8 is a diagram illustrating structure of a mobile terminal, according to various embodiments. As shown in FIG. 8, based on the various embodiments illustrated with FIG. 7, the mobile terminal according to the various embodiments may further include the following.

The obtaining module 20 in the mobile terminal according to the various embodiments may be configured to obtain current longitude and latitude information and obtain a grid number corresponding to current longitude and latitude information, based on a preset longitude and latitude range of the earth sphere identified by each grid number.

As shown in FIG. 8, the mobile terminal according to the various embodiments may further include a processing module 22, a dividing module 23 and a numbering module 24. Before the transmitting module 21 transmits the search request, the processing module 22 is configured to project the earth sphere onto a plane of L1*L2, based on equatorial circumference L1, as well as spherical distance L2 of south and north poles. The dividing module 23 may be connected with the processing module 22. The dividing module 23 is configured to divide the plane of L1*L2 obtained by the processing module 22 into multiple grids equally, based on a preset distance unit. Each grid ID of the multiple grids may correspond to a preset longitude and latitude range of the earth sphere. The numbering module 24 may be connected with the dividing module 23. The numbering module 24 is configured to number the multiple grids obtained by the dividing module 23 successively, and obtain multiple grid numbers.

The corresponding obtaining module 20 may be connected with the numbering module 24. The obtaining module 20 may be configured to obtain a grid number corresponding to current longitude and latitude information, based on the preset longitude and latitude range of the earth sphere identified by each grid number, which is obtained by the numbering module 24 after numbering.

By employing the foregoing modules, the mobile terminal according to the various embodiments has provided all of the optional technical methods according to various embodiments. All of the optional technical methods according to the foregoing various embodiments may be combined in any way to form an optional example of the present disclosure, which will not be repeated here.

Implementation mechanism for processing information by using the foregoing modules in the mobile terminal according to the various embodiments may be similar to the implementation mechanism according to the foregoing related method embodiments, which may refer to descriptions of the various foregoing related method embodiments and will not be repeated here.

By employing the foregoing modules in the mobile terminal according to the various embodiments, compared with the search scheme based on the geohash method in the prior art, search speed may be faster. Search efficiency may be higher. Information processing efficiency may be improved effectively.

Various embodiments may also provide an information processing system. The information processing system may include a server device and a mobile terminal. The server device in the information processing system may be the server device according to various embodiments illustrated with FIG. 5. The mobile terminal in the information processing system may be the mobile terminal according to various embodiments illustrated with FIG. 7. At this time, it is requested that the location information in the search request received by the receiving module 10 in the server device from the first mobile terminal to be the grid number of the grid, which is located by the first mobile terminal, when the first mobile terminal transmits the search request. During the implementations, it may refer to descriptions according to foregoing related various embodiments, which will not be repeated here.

It should be noted that, when processing information with the server device and the mobile terminal according to various embodiments, descriptions are provided by using division of foregoing functional modules. In practical applications, foregoing functions may be allocated to different modules to be completed based on requirements. That is, the internal structure of the device may be divided into different functional modules, so as to complete all of or part of functions described above. In addition, conceptions of the server device and mobile terminal provided according to the foregoing related embodiments may be similar to that of the various method embodiments regarding information processing. Implementation processes may refer to foregoing various method embodiments, which will not be repeated here.

Numbers of the foregoing embodiments are provided for descriptions, which are not used for representing best or better examples.

One with ordinary skill in the art may understand that all of or part of the blocks in the foregoing various embodiments may be completed with hardware, or with hardware instructed by a program. The program may be stored in a computer readable storage medium. The foregoing storage medium may be a read-only memory (ROM), a disk or a compact disk (CD), and so on.

Figure 9:
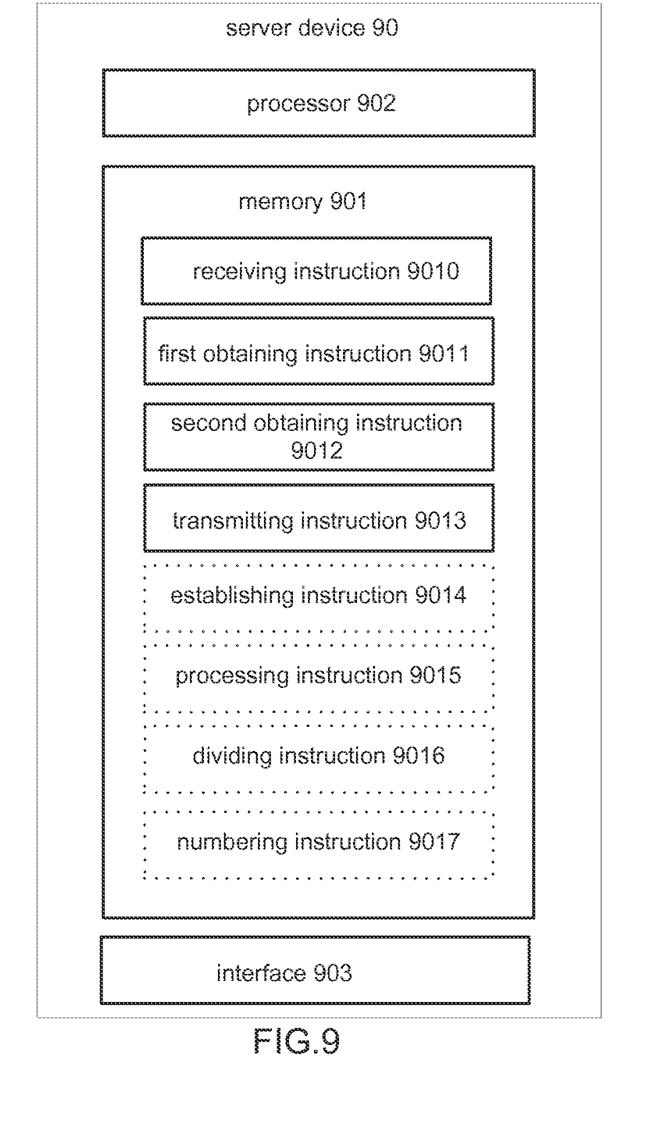
FIG. 9 is a diagram illustrating structure of a server device, according to various embodiments.

FIG. 9 is a diagram illustrating structure of a server device, according to various embodiments. As shown in FIG. 9, the server device 90 according to various embodiments may include a memory 901, a processor 902 in communication with the memory 901, and an interface 903. The memory 901 stores a receiving instruction 9010, a first obtaining instruction 9011, a second obtaining instruction 9012, and a transmitting instruction 9013, which are executable by the processor 902.

The receiving instruction 9010 indicates to receive a search request transmitted by a first mobile terminal via the interface 903. The search request may carry location information located by the first mobile terminal, when the first mobile terminal transmits the search request. The first obtaining instruction 9011 indicates to obtain a corresponding grid number, based on the location information received based on the receiving instruction 9010. The grid number is configured to identify a preset longitude and latitude range of the earth sphere. The second obtaining instruction 9012 indicates to obtain information searching for, based on the grid number. The transmitting instruction 9013 indicates to transmit information searched out, which is obtained based on the second obtaining instruction 9012, to the first mobile terminal.

As shown in FIG. 9, the memory 901 may further store an establishing instruction 9014, a processing instruction 9015, a dividing instruction 9016, and a numbering instruction 9017, which are executable by the processor 902. When being executed, functions implemented by the receiving instruction 9010, the first obtaining instruction 9011, the second obtaining instruction 9012, the transmitting instruction 9013, the establishing instruction 9014, the processing instruction 9015, the dividing instruction 9016, and the numbering instruction 9017 are respectively similar to functions of the receiving module 10, the first obtaining module 11, the second obtaining module 12, the transmitting module 13, the establishing module 14, the processing module 15, the dividing module 16 and the numbering module 17 according to various embodiments illustrated with FIG. 6, which will not be repeated here.

By employing the foregoing technical method of various embodiments, the corresponding grid number may be obtained based on the location information. Information searching for may also be obtained, based on the grid number. Compared with the search scheme based on the geohash method in the prior art, the server device may be enabled to rapidly search out the information Search speed may be faster. Search efficiency may be higher. Information processing efficiency may be improved effectively.

Figure 10:
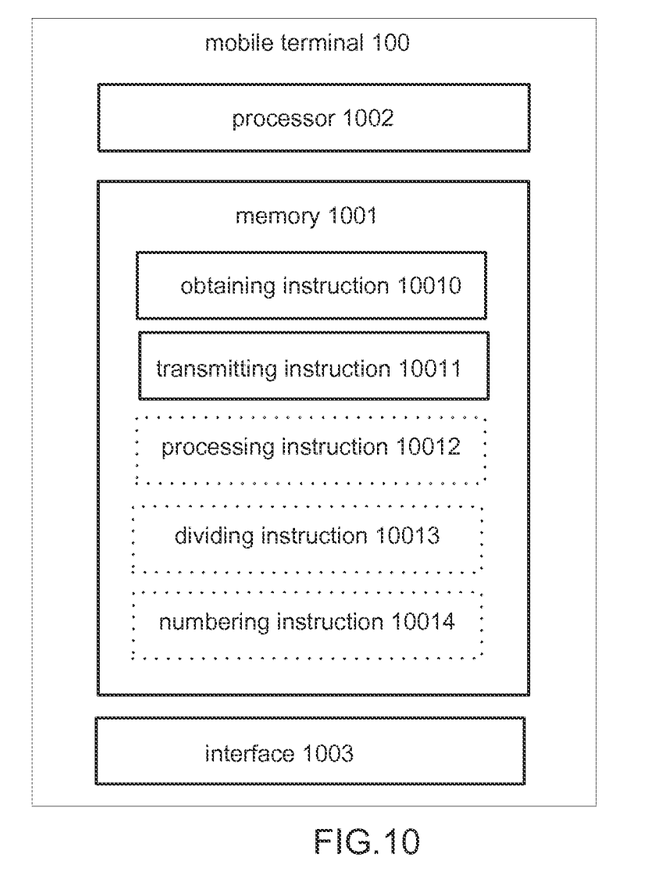
FIG. 10 is a diagram illustrating structure of a mobile terminal, according to various embodiments.

FIG. 10 is a diagram illustrating the structure of a mobile terminal, according to various embodiments. As shown in FIG. 10, the mobile terminal 100 according to various embodiments may include a memory 1001, a processor 1002 in communication with the memory 1001, and an interface 1003. The memory 1001 may store an obtaining instruction 10010 and a transmitting instruction 10011, which are executable by the processor 1002.

The obtaining instruction 10010 indicates to obtain a grid number of a grid currently located by the mobile terminal via the interface 1003. The mobile terminal may be located in a preset longitude and latitude range identified by the grid number. The transmitting instruction 10011 indicates to transmit a search request, which carries the grid number, to a server, such that the server may obtain information searching for based on the grid number, and return information searched out.

As shown in FIG. 10, the memory 1001 in the mobile terminal 100 according to various embodiments may further store a processing instruction 10012, a dividing instruction 10013, and a numbering instruction 10014, which are executable by the processor 1002. When being executed, functions implemented by the obtaining instruction 10010, the transmitting instruction 10011, the processing instruction 10012, the dividing instruction 10013, and the numbering instruction 10014 may be respectively similar to functions implemented by the obtaining module 20, the transmitting module 21, the processing module 22, the dividing module 23, and the numbering module 24 according to various embodiments illustrated with FIG. 8, which will not be repeated here.

By employing the foregoing technical method according to various embodiments, compared with the search scheme based on the geohash method in the prior art, search speed may be faster. Search efficiency may be higher. Information processing efficiency may be improved effectively.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A computer-implemented information processing method, comprising:
receiving a search request transmitted by a first mobile terminal, wherein the search request includes location information of the first mobile terminal, when the first mobile terminal transmits the search request;
obtaining a corresponding grid number based on the location information, wherein the grid number is configured to identify a preset longitude and latitude range of the earth sphere;
obtaining all microblogs searching for based on the grid number, wherein the all microblogs are published in the preset longitude and latitude range of the earth sphere identified by the grid number, wherein obtaining the all microblogs includes obtaining a first microblog corresponding to the grid number based on a corresponding relationship between the grid number and a microblog identity (ID) and based on the grid number;
transmitting the obtained microblogs to the first mobile terminal; and
before receiving the search request transmitted by the first mobile terminal;
receiving the first microblog transmitted by a second mobile terminal, the first microblog including first location information, the first location information including the grid number or a longitude and a latitude located by the second mobile terminal, when the second mobile terminal transmits the first microblog, the longitude and latitude being located by the second mobile terminal, when the second mobile terminal transmits the first microblog is included in the preset longitude and latitude range identified by the grid number; and establishing a corresponding relationship between the grid number and the microblog identity (ID) of the first microblog.

2. The computer-implemented method according to claim 1, wherein the location information comprises the grid number, or a longitude and a latitude located by the first mobile terminal, when the first mobile terminal transmits the search request.

3. The computer-implemented method according to claim 2, wherein obtaining the corresponding grid number based on the location information, under circumstances that the location information comprises the longitude and latitude located by the first mobile terminal, when the first mobile terminal transmits the search request, comprises:

obtaining the grid number corresponding to the longitude and latitude located by the first mobile terminal, when the first mobile terminal transmits the search request, based on a preset longitude and latitude range of the earth sphere identified by each grid number, wherein the longitude and latitude located by the first mobile terminal, when the first mobile terminal transmits the search request, is comprised in the preset longitude and latitude range identified by the grid number.

4. The computer-implemented method according to claim 1, wherein obtaining the all microblogs searching for based on the grid number comprises:

obtaining the nearest adjacent grid number of a second grid, which is nearest adjacent to a first grid identified by the grid number; and obtaining a second microblog corresponding to the nearest adjacent grid number, based on a corresponding relationship between the grid number and the microblog ID, and based on the nearest adjacent grid number.

5. The computer-implemented method according to claim 4, further comprising:

before receiving the search request transmitted by the first mobile terminal, receiving the second microblog transmitted by a third mobile terminal, wherein the second microblog carries second location information, the second location information comprises the grid number, or a longitude and a latitude located by the third mobile terminal, when the third mobile terminal transmits the second microblog; the longitude and latitude located by the third mobile terminal, when the third mobile terminal transmits the second microblog, is comprised in the preset longitude and latitude range identified by the grid number; and establishing a corresponding relationship between the nearest adjacent grid number and the microblog ID of the second microblog.

6. The computer-implemented method according to claim 1, further comprising:

before receiving the search request transmitted by the first mobile terminal, projecting the earth sphere onto a plane of L1*L2, based on equatorial circumference L1, as well as spherical distance L2 of south and north poles;

dividing the plane of L1*L2 into multiple grids equally based on a preset distance unit, wherein a grid ID of the multiple grids corresponds to a preset longitude and latitude range of the earth sphere; and numbering the multiple grids successively, and obtaining multiple grid numbers.

7. A server device, comprising a memory, a processor in communication with the memory, and an interface, wherein the memory stores a receiving instruction, a first obtaining instruction, a second obtaining instruction, a transmitting instruction, and an establishing instruction which are executable by the processor, the receiving instruction indicates to receive a search request transmitted by a first mobile terminal via the interface, wherein the search request includes location information of the first mobile terminal, when the first mobile terminal transmits the search request;

the first obtaining instruction indicates to obtain a corresponding grid number based on the location information, wherein the grid number is configured to identify a preset longitude and latitude range of the earth sphere;

the second obtaining instruction indicates to obtain all microblogs searching for based on the grid number, wherein the all microblogs are published in the preset longitude and latitude range of the earth sphere identified by the grid number;

the transmitting instruction indicates to transmit the all microblogs searched out to the first mobile terminal, wherein the second obtaining instruction directs obtaining a first microblog corresponding to the grid number, based on a corresponding relationship between the grid number and microblog identity (ID), and based on the grid number; and the establishing instruction indicate, before receiving the search request transmitted by the first mobile terminal, the receiving instruction further indicates to receive the first microblog transmitted by a second mobile terminal, wherein the first microblog includes first location information, the first location information including the grid number or a longitude and a latitude located by the second mobile terminal, when the second mobile terminal transmits the first microblog, wherein the longitude and latitude being located by the second mobile terminal, when the second mobile terminal transmits the first microblog is included in the preset longitude and latitude range identified by the grid number, the establishing instruction indicates to establish a corresponding relationship between the grid number and the microblog ID of the first microblog.

8. The device according to claim 7, wherein the location information comprises the grid number, or a longitude and a latitude located by the first mobile terminal, when the first mobile terminal transmits the search request.

9. The device according to claim 8, wherein when the location information comprises the longitude and latitude located by the first mobile terminal, when the first mobile terminal transmits the search request, the first obtaining instruction further indicates to obtain the grid number corresponding to the longitude and latitude located by the first mobile terminal, when the first mobile terminal transmits the search request, based on a preset longitude and latitude range of the earth sphere identified by each grid number;

wherein the longitude and latitude located by the first mobile terminal, when the first mobile terminal transmits the search request, is comprised in the preset longitude and latitude range identified by the grid number.

10. The device according to claim 7, wherein the second obtaining instruction further indicates to obtain the nearest adjacent grid number of a second grid, which is nearest adjacent to a first grid identified by the grid number, and obtain a second microblog corresponding to the nearest adjacent grid number, based on the corresponding relationship between the grid number and the microblog ID, and based on the nearest adjacent grid number.

11. The device according to claim 10, wherein before receiving the search request transmitted by the first mobile terminal based on the receiving instruction, the receiving instruction further indicates to receive a second microblog transmitted by a third mobile terminal; the second microblog carries second location information, the second location information comprises the grid number, or a longitude and a latitude located by the third mobile terminal, when the third mobile terminal transmits the second microblog;

wherein the longitude and latitude located by the third mobile terminal, when the third mobile terminal transmits the second microblog, is comprised in the preset longitude and latitude range identified by the grid number; and     the establishing instruction further indicates to establish a corresponding relationship between the nearest adjacent grid number and microblog ID of the second microblog.

12. The device according to claim 7, wherein the memory further stores a processing instruction, a dividing instruction and a numbering instruction, which are executable by the processor;

before receiving the search request transmitted by the first mobile terminal based on the receiving instruction, the processing instruction indicates to project the earth sphere onto a plane of L1*L2, based on equatorial circumference L1, spherical distance L2 of south and north poles;

the dividing instruction indicates to divide the plane of L1*L2 into multiple grids equally, based on a preset distance unit, wherein each grid ID of the multiple grids corresponds to a preset longitude and latitude range of the earth sphere; and     the numbering instruction indicates to number the multiple grids successively, and obtain multiple grid numbers.

\* \* \* \* \*